United States Patent [19]

Cadeo et al.

[11] Patent Number: 4,964,732

[45] Date of Patent: Oct. 23, 1990

[54] METHOD FOR CONTINUOUSLY PRODUCING A FLOWABLE MIXTURE

[75] Inventors: Angelo Cadeo, Fichtenweg 24, 4852 Rothrist; Ruedi Zellweger, Zofingen, both of Switzerland

[73] Assignees: Miteco AG, Zofingen; Angelo Cadeo, Rothrist, both of Switzerland

[21] Appl. No.: 325,385

[22] Filed: Mar. 17, 1989

[30] Foreign Application Priority Data

Mar. 22, 1988 [CH] Switzerland ............... 1086/88

[51] Int. Cl.$^5$ ............................................. B01F 15/02
[52] U.S. Cl. ...................................... 366/159; 366/152; 366/154; 366/161; 366/177; 366/182; 366/348
[58] Field of Search ................ 366/2, 6, 8, 16, 17, 366/76, 132, 134, 136, 152, 137, 151, 150, 154, 159, 160–162, 177, 336, 337, 348, 142, 182, 601; 222/137; 417/503, 555.1

[56] References Cited

U.S. PATENT DOCUMENTS

| | | | |
|---|---|---|---|
| 3,608,869 | 9/1971 | Woodle | 366/159 X |
| 4,260,739 | 4/1981 | Geyer, Jr. et al. | 366/348 |
| 4,378,335 | 3/1983 | Boden et al. | 366/137 |
| 4,635,825 | 1/1987 | Tulasne | 366/177 |
| 4,673,296 | 6/1987 | Sjogren | 417/503 |
| 4,854,713 | 8/1989 | Soechtig | 366/132 |

*Primary Examiner*—Timothy F. Simone
*Attorney, Agent, or Firm*—Shenier & O'Connor

[57] ABSTRACT

The mass flow of the individual goods fed from a respective storage tank by a conveying apparatus is measured by a flowmeter. The mass flow is controlled via a controller. As long as the actual value of the flow masses of each separate component does not correspond to their respective rated value, all mass flows are returned via a switch-over valve and a return line back to the respective storage tank. When all actual values correspond to their rated values, the switch-over valves will switch such that the individual components are guided through the feed line to the mixing apparatus. The mixture produced in this mixing apparatus is once more analyzed by further detecting devices. If the analyzed actual values again do not correspond to the rated analyzed values, an immediate switching of the switch-over valves to the return bypass operation is again initiated. It is therefore no longer necessary to lead a mixture in the form of waste away during the time span, during which the individual control circuits begin to stabilize, because at such duration the product will not yet correspond to its rated values. The individual components are rather fed back again to their respective storage tanks during such time span, such that no loss of production is suffered and a high quality of the final product is attained.

2 Claims, 3 Drawing Sheets

METHOD FOR CONTINUOUSLY PRODUCING A FLOWABLE MIXTURE

BACKGROUND OF THE INVENTION

1. FIELD OF THE INVENTION

The present invention relates to a method of continuously producing a flowable mixture, composed of at least two components, which components are separately fed from a respective storage tank and thereafter intermixed to produce a final product.

The invention also relates to an apparatus for the continuous production of a flowable mixture, composed of at least two components, which components are separately fed from a respective storage tank, and thereafter intermixed to produce a final product.

2. DESCRIPTION OF THE PRIOR ART

The commonly applied procedure for producing such flowable mixtures is to feed the individual components, which are to make up such mixture, which are generally in a liquid state, out of their respective storage or keeping, respectively, tanks, whereafter these flowing components are dosed by individually controlling the respective mass flows of the components being fed, and by keeping the individual mass flows at a constant value. To this end, use is made of pumping devices, flowmeters, controlling apparatuses, etc., which form together a control circuit.

It is generally known that a certain time span elapses until such a control circuit has stabilized, i.e. until it has reached its steady-state condition. Depending from the complexity of a given control circuit, the mentioned time span is of a more or less long duration.

The product, which is composed of the various components, does generally not feature the desired quality during the duration of mentioned time span and accordingly must be led off as waste, which is obviously a more or less big loss for a respective production plant.

SUMMARY OF THE INVENTION

It is, therefore, a general object of the present invention to provide a method of continuously producing a flowable mixture, composed of at least two components, which produces no waste.

A further object of the invention is to provide an apparatus for the continuous production of a flowable mixture, composed of at least two components that are intermixed to produce a final product, which does not give rise to the production of waste.

A further object is to provide a method of continuously producing a flowable mixture, composed of at least two components, comprising the steps of measuring the actual value of the mass flow of each separate component fed from its respective storage tank, and of comparing said actual value with a respective rated value; of feeding all components fed from their respective storage tank in a closed loop back to their respective storage tank until the actual value of every single mass flow corresponds to its rated value; and of bringing the individual components together and intermixing same as soon as each actual value corresponds to its respective rated value.

Yet a further object of the present invention is to provide an apparatus for the continuous production of a flowable mixture, composed of at least two components, which apparatus comprises a plurality of storage tanks, of which each is intended to store one of the components to be intermixed, each storage tank is followed in the direction of the flow of the component by a component conveying apparatus, a flowmeter coupled to a component flow controller and a switch-over valve, which switch-over valve is coupled on the one hand to a return line extending back to the respective storage tank, and on the other hand to a feed line extending to a common component mixing apparatus, and comprising a means for controlling the mass flow of the respective component.

BRIEF DESCRIPTION OF THE DRAWING

The present invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
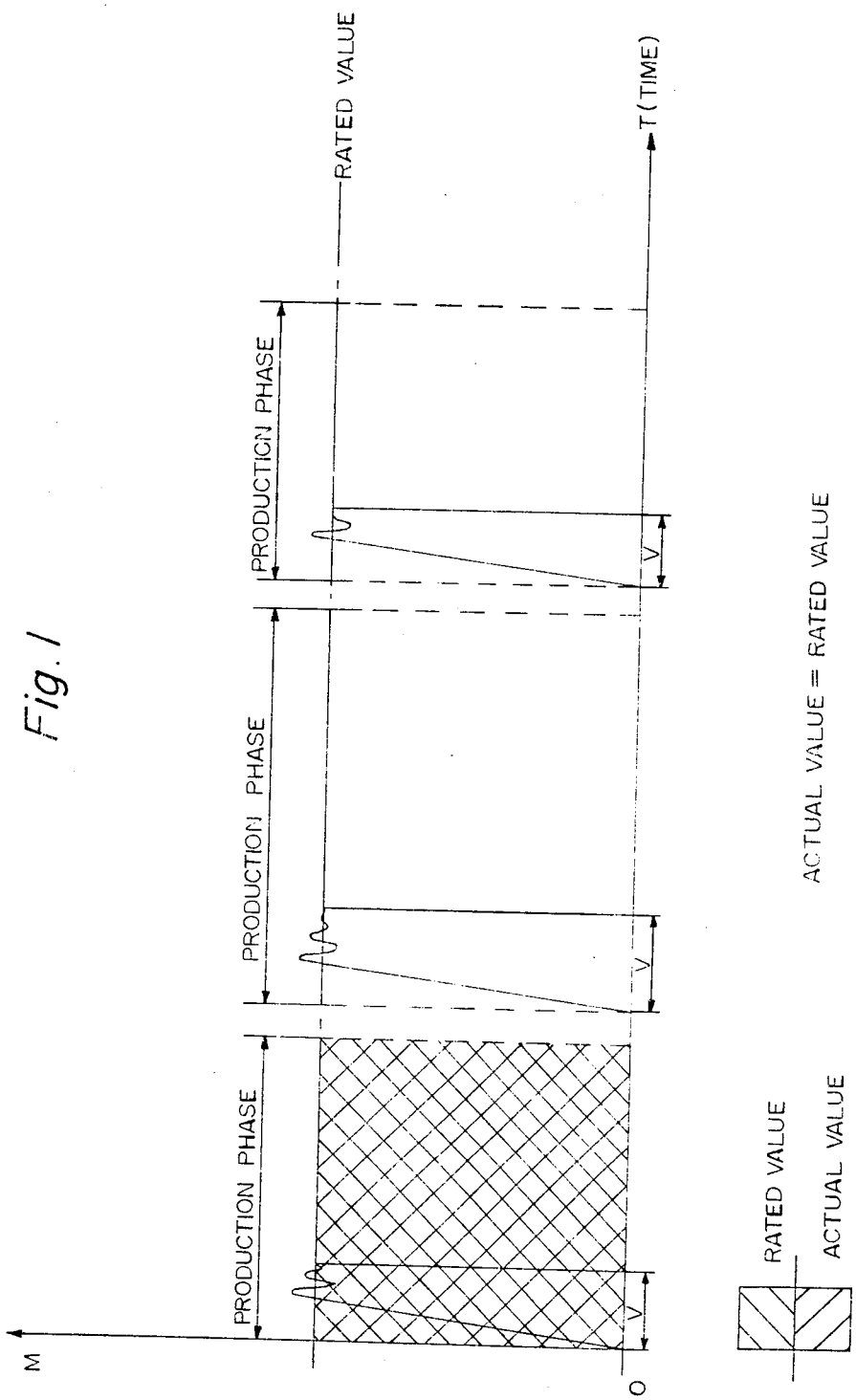
FIG. 1 illustrates a production program of known plants.

FIG. 1 illustrates the production diagram, arrived at by known procedures. The letter M designates the mass flow and T denotes the time. The object of the operation is now to arrive at the rated value and to maintain the rated value in a steady state. The plant is started at the point O, from which point O the mass flow begins to increase and shall finally reach its rated value, i.e. it is to reach the condition in which the actual value corresponds to the rated value (obviously within the allowed tolerances). A certain time span v elapses before the sought steady-state condition is arrived at. According to the procedure followed in known plants, i.e. in accordance with known methods, the individual component flows are brought together already during this time span v, which components are also mixed, and quite obviously the product produced thereby does not feature the desired or rated, respectively, composition. Such product now cannot be used, i.e. in case of e.g. a foodstuffs plant or a semi-luxury products plant, the mixture obtained thereby cannot be filled into a container, a can or bottle, respectively. Contrary thereto, the mixture which does not feature the necessary quality must be led away as waste.

Figure 2:
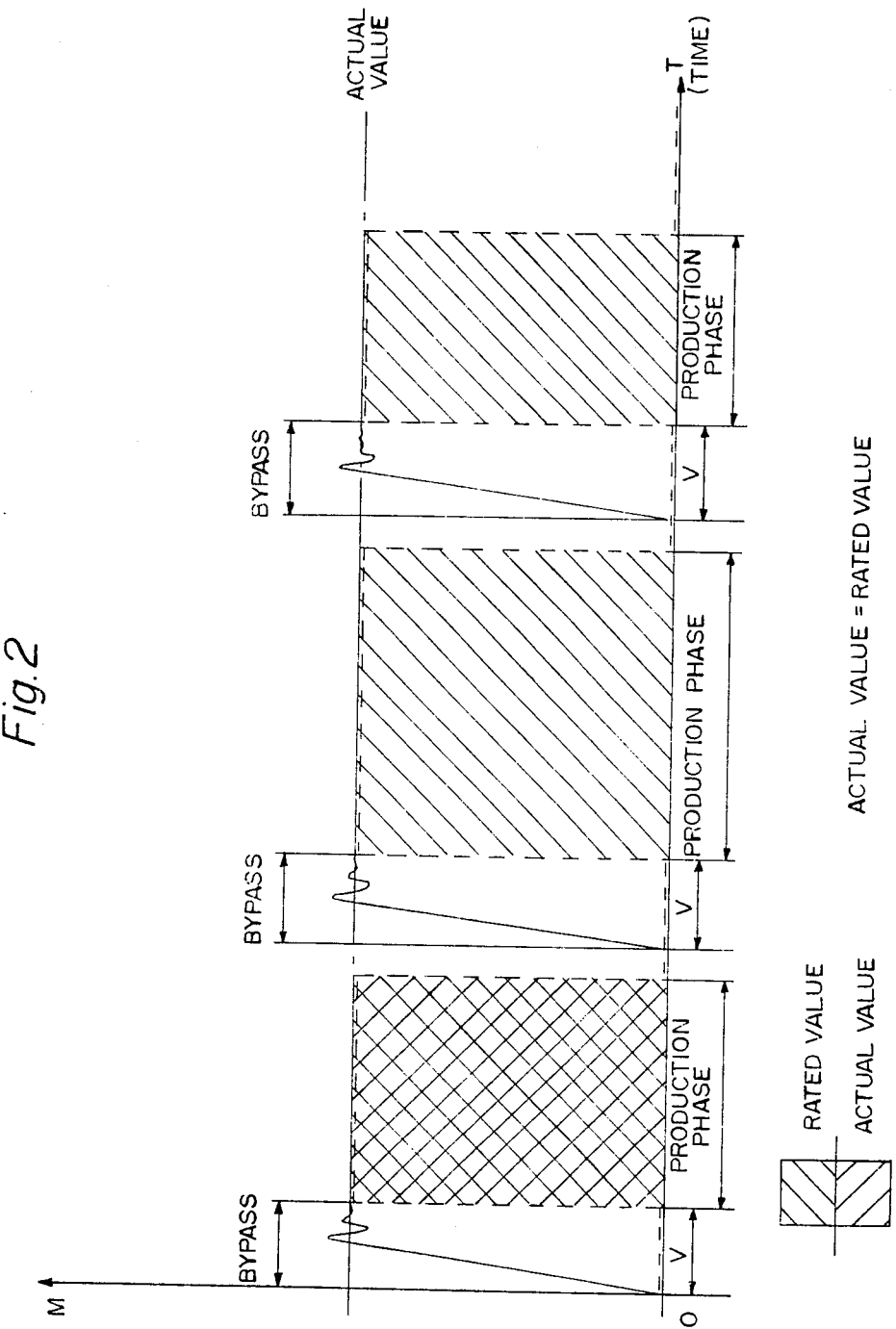
FIG. 2 illustrates a production diagram of a plant operated in accordance with the present inventive method.
Figure 3:
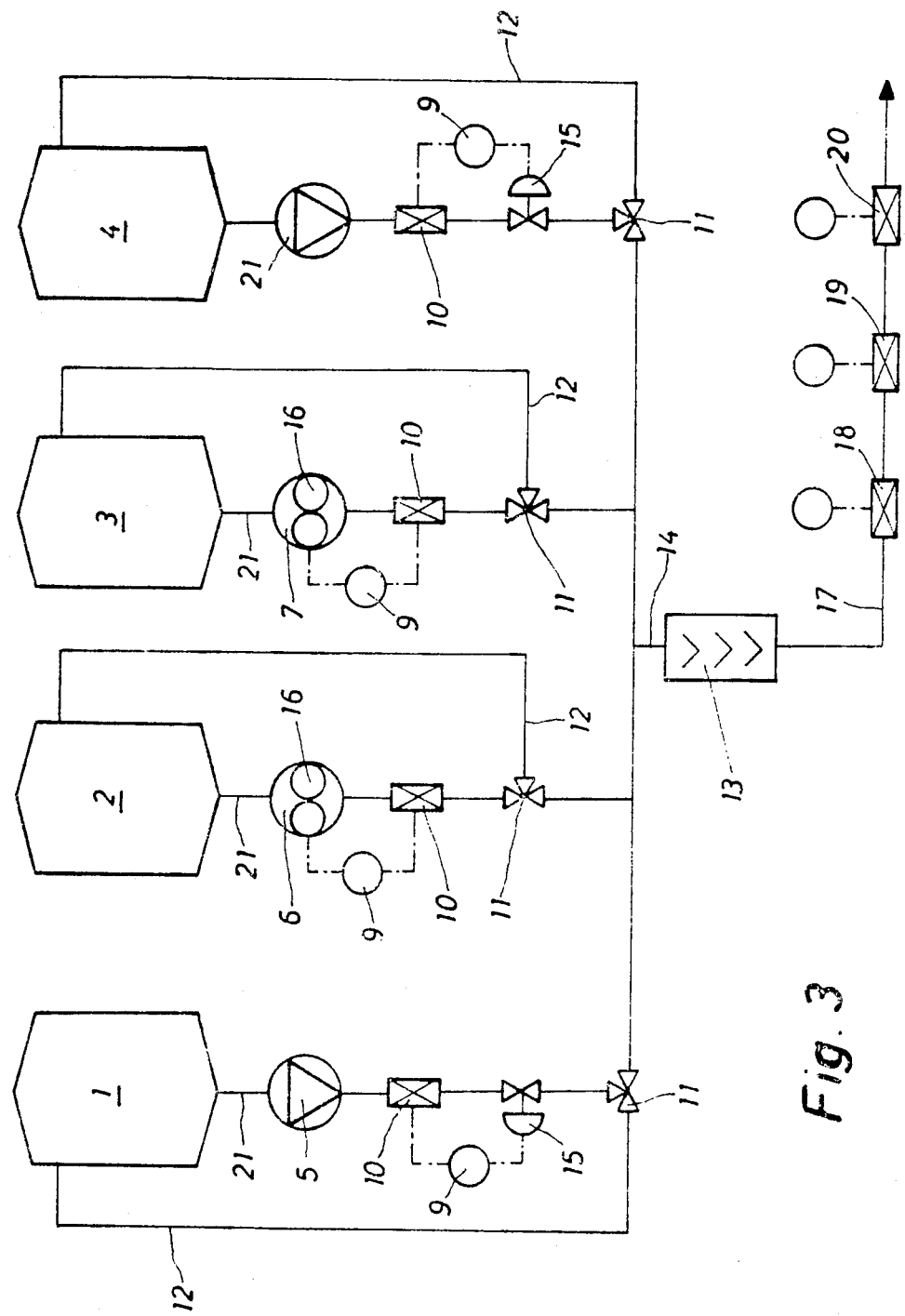
FIG. 3 illustrates a flow diagram of an apparatus structured in accordance with the present invention.

Attention is now drawn to FIGS. 2 and 3. FIG. 3 illustrates schematically, roughly in the form of a flow sheet, a plant in which four components are intermixed such to produce a mixture. The reference numerals 1–4 denote each a storage tank for one individual component. It shall be assumed that storage tank 1 contains a sugar solution, storage tank 2 a first concentrate, storage tank 3 a second concentrate and storage tank 4 contains water. The commodity present in storage tank 1 flows through the outflow line 21 to a conveying apparatus 5. It has been indicated above that as example a sugar solution is contained in the storage tank 1. Correspondingly, the conveying apparatus 5 comprises a fluid flow engine or centrifugal pump, respectively. The amount of the commodity pumped by this conveying apparatus 5 flows thereafter through a flowmeter 10, which measures the mass flow. This flowmeter 10 is connected to a controller 9, which in turn controls a control valve 15, by means of which the mass flow of the commodity flowing out of the storage tank 1 and being conveyed by the pump 5 is controlled, with the object to control the actual value detected at the flowmeter 10 via the controller 9 such that it reaches its rated value.

A switch-over valve 11 is located, seen in the direction of flow after the control valve 15. This switch-over valve 11 can be operated in two positions. In its first control position it generates a fluid flow connection between the outflow line 21 after the control valve 15 and a return line 12 through which return line 12 the commodity can flow back into its storage tank 1.

If the switch-over valve 11 is in its second position, the commodity flows through the feed line 14 to a static mixer 13.

The outflow coming from the storage tanks 2–4 is conveyed and specifically controlled by the same procedure. However, in this case it is assumed that the concentrates, stored in the storage tanks 2 and 3, are highly viscid materials such that the conveying apparatus located at the storage tank 2 is a positive displacement pump 6, and the conveying apparatus located at the storage tank 3 comprises a positive displacement pump 7. These pumps 6, 7 may be, for instance, geared pumps. Conclusively, the mass flow detected at the flowmeter 10 is controlled by the respective controller 9, in that this controller 9 influences the speed control device of the gear pump 6, 7, which control device is schematically identified by the reference numeral 16.

All three outflow lines 21 of these storage tanks are also provided with a switch-over valve 11, by means of which the commodity that is being conveyed is controlled to either flow through the return line 12 to its respective storage tank or then to the feed line 14, which feed line 14 is connected to a mixer 13, which in the illustrated embodiment is a static mixer. This static mixer 13 is connected to an outflow line 17, provided with further measuring or detecting, respectively, devices, which are illustrated on an exemplary basis only by the reference numerals 18, 19 and 20. The outflow line 17 extends finally, for instance, to a racking apparatus, eg to a bottling apparatus.

During the initial start-up phase of the plant, the switch-over valves 11 are operated in such a position according to which the commodities flowing out of the respective storage tanks 1–4 are led back through the return lines 12 into said storage tanks. This state of return flow will now be maintained for every component until the individual control circuit, i.e. the four control circuits of this embodiment have stabilized and the actual values as determined by the flowmeters 10 correspond to the corresponding rated values (within the tolerable limits), corresponding to the respective final product. After all four control circuits have stabilized, all four switch-over valves 11 are switched, such that now the components flow through the feed line 14 to the mixer 13. It is important to note that the condition for the mentioned switching over is that all four control circuits have reached a steady state. In other words, if in case of a high viscid concentrate fed from the storage tank 2 a time span of longer duration is needed until its control circuit arrives at its steady state condition than of the other three components, these other components, although their control circuit has already arrived at its steady state condition, will still be fed back through their return lines 12 into their storage tank, and only after the last and final control circuit has reached its steady state condition, the switching over of all four switch-over valves 11 is carried out.

It is to be noted that the switching over procedure of the switch-over valves 11 can in no way influence and disturb the stability of the control circuits because all corresponding components, i.e. pumps, flowmeters, control valves, controllers, etc., which together form the respective control circuits, are no longer influenced by this switching operation because merely the direction of flow is altered. This switching is, therefore, not detected as a disturbance in the control circuit, and the component values of the individual components, which together will form the final product, features immediately the desired rated values.

The individual components flow at the now exactly controlled mass flow through the feed line 14 to the mixer 13, which in this embodiment is a static mixer and can be structured in accordance with various generally known designs, in accordance with the final product which the components are being mixed.

After the mixer various properties, parameters of the product, are measured, indicated and also registered by detecting devices 18, 19 and 20. These detecting devices will be explained somewhat more in detail further below.

As soon as the control circuits have reached their stable, steady state condition, i.e. when the individual components are fed through the feed line 14 to the static mixer 13, anyone of the flowmeters 10 detects a not tolerable deviation of the rated value, all switch-over valves 11 get again switched to make the communication with the return line, such that all components, i.e. also those components flowing with a mass flow which corresponds to the rated flow, are again fed back in a closed loop to the storage tanks 1–4. This state is now maintained until the single control circuit, in which a deviation has been detected, has again reached its rated value. Thereafter the switching of the switch-over valve is initiated and all components led again to the mixer 13 for the final production.

The detecting devices 18, 19, 20 detect whether the final product prior to for instance the bottling features truly the characteristics of the specific product being marketed (for example concentration, pH-value, acidity, viscosity, contents of acidity and sugar, alcohol, etc.). Accordingly, a controlling or checking, respectively, of the produced mixed product is made. As example it can be mentioned that the detecting device 18 determines the density, the detecting device 19 the acidity and the detecting device 20 the concentration of the mixture. If now one of the detecting devices 18–20 detects a deviation from the rated value, the switch-over valves 11 are again switched to the return flow state (although the individual mass flows according to the flow meters 10 correspond to the rated values). At the same time, an alarm is produced, such that an operator can check the entire plant regarding any defects. A variety of reasons may give rise for such a defect case, for instance a wrong recipe for the beverage, a wrong selection of the individual components or it is also possible that defects have occurred at measuring or detecting devices. By the above after-checking, it is accordingly not possible that the final product does not correspond to the given features or characteristics. If now the method forming the basis of the illustration of FIG. 3, whereto also reference is made to FIG. 2, is compared with known methods, the following important advantage can be seen.

According to the diagram of FIG. 1, the respective mixture is led away as waste, i.e. as loss of the production during the time span v until all control circuits have stabilized, are in their steady-state condition. According to FIG. 2 now, these mass flows of the individual components are not led away as waste during the same time span v and rather led back via the bypass, the return line 12, to their individual storage tanks, such that no loss will be suffered at all. It should be borne in mind that the outflow line 17 after the mixer 13 of any production plant extends to racking apparatuses, for instance to bottling apparatuses. Quite obviously, time and again, disturbances or any kind of interruption of the operation can happen in such apparatus, such that the complete mixing plant must be switched over to a "non-load" condition. If now a respective disturbance, i.e. the reason therefor, has been eliminated, the entire plant must again be started up, i.e. it must be put back into operation, whereby the above mentioned losses occur in plants operating in accordance with the known methods, and in contrast thereto, the plant operating in accordance with the present invention, does not produce any loss of any of the components. Interruption of the production can occur at the racking stations several times during one working day, and such must not actually be some kind of break-down or malfunctioning of the apparatus, the reason for such disturbance may for instance simply be that the feeding of the bottles is interrupted for a short time span, because for instance any kind of delivery of the bottles can suffer a short delay or interstice, because the feeding of any other kind of article may suffer a short interruption, for instance labels, because the bottle cleansing and rinsing plant may cause a short interruption, ect.

Because now the procedure in accordance with the illustrated embodiment is such that on the one hand the respective mass flow of the individual components is measured and the mixing is commenced not earlier than when all actual values correspond to the rated values, and on the other hand the mixture is analyzed once more, and also if during this step an actual value does not correspond to a rated value, a switching over to the returning operation (return line 12) is made, no loss of production whatsoever is suffered, and accordingly a large yield of the production is attained. Furthermore, the plant structured in accordance with the inventive method can be operated simply and quite obviously an extremely high quality standard of the final product is reached.

While there are shown and described present preferred embodiments of the invention, it is to be distinctly understood that the invention is not limited thereto, but may be otherwise variously embodied and practiced within the scope of the following claims.

We claim:

1. A method of continuously producing a flowable mixture composed of at least two components, which components are individually fed from a respective storage tank and thereafter intermixed to produce a final product, comprising the steps of measuring the actual value of the mass flow of each separate component fed from its respective storage tank and of comparing said actual value with a respective rated value;

of feeding all components fed from their respective storage tank in a closed loop individually back to their respective storage tank until the actual value of every single mass flow corresponds to its rated value; and of uniting the individual components and of intermixing same as soon as every individual actual value corresponds to its respective rated value.

2. The method of claim 1, in which the characteristics of the flowable mixture, composed of the various components, are continuously measured or analyzed, respectively, and in which, in case of any deviation of one of the measured or analyzed, respectively, actual value from its corresponding rated value, the uniting and intermixing of the components fed . from their storage tanks is interrupted and the closed loop flow of the respective components back to their storage tanks is reinstated and maintained until every single actual value of each component mass flow corresponds to its rated value.

* * * * *